United States Patent [19]

Reczek et al.

[11] Patent Number: 4,599,389

[45] Date of Patent: Jul. 8, 1986

[54] POLYMERIC MORDANT CONTAINING NITROGEN-COORDINATING LIGAND FOR METALLIZABLE DYES

[75] Inventors: James A. Reczek, Rochester; Ignazio S. Ponticello, Pittsford; Philip S. Bryan, Webster, all of N.Y.

[73] Assignee: Eastman Kodak Company, Rochester, N.Y.

[21] Appl. No.: 791,018

[22] Filed: Oct. 24, 1985

Related U.S. Application Data

[62] Division of Ser. No. 688,205, Jan. 2, 1985.

[51] Int. Cl.$^4$ ........................ C08F 26/06; C08F 26/08; C08F 126/06; C08F 26/12

[52] U.S. Cl. .................................... 526/265; 525/540; 526/258; 526/259; 526/260; 526/261; 526/262; 526/263; 526/241; 528/395; 528/423; 528/424

[58] Field of Search ................ 430/213, 941; 526/258, 526/259, 260, 261, 262, 263, 265, 241; 528/395, 423, 424; 525/540

[56] References Cited

U.S. PATENT DOCUMENTS

| | | | |
|---|---|---|---|
| 4,193,796 | 3/1980 | Campbell et al. | 430/213 |
| 4,239,847 | 12/1980 | Archie et al. | 430/213 |
| 4,282,305 | 8/1981 | Brust et al. | 430/213 |
| 4,506,001 | 3/1985 | Sakaguchi et al. | 430/213 |

*Primary Examiner*—Richard L. Schilling
*Attorney, Agent, or Firm*—Harold E. Cole

[57] ABSTRACT

Photographic elements and diffusion transfer assemblages described which contain a novel mordant comprising a polymeric backbone having appended thereto nitrogen-coordinating ligands having the formula:

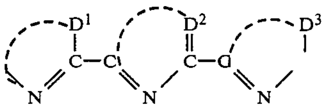

wherein $D^1$, $D^2$, and $D^3$ each independently represents the atoms necessary to complete an aromatic heterocyclic nucleus having at least one ring of 5 to 7 atoms.

In a preferred embodiment, the mordant comprises recurring units having the formula:

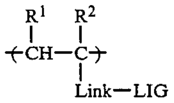

wherein:

$R^1$ and $R^2$ each independently represents hydrogen or an alkyl or substituted alkyl group having from 1 to about 6 carbon atoms;

Link represents a bivalent linking group; and

LIG represents a nitrogen-coordinating ligand as described above.

9 Claims, No Drawings

POLYMERIC MORDANT CONTAINING NITROGEN-COORDINATING LIGAND FOR METALLIZABLE DYES

This is a division of application Ser. No. 688,205, filed Jan. 2, 1985.

This invention relates to photography, and more particularly to color diffusion transfer photography employing a novel polymeric mordant which contains a nitrogen-coordinating ligand for metallizable dyes. The mordants of this invention provide a more complete and rapid dye metallization.

Various formats for color, integral transfer elements are described in the prior art, such as U.S. Pat. Nos. 3,415,644; 3,415,645; 3,415,646; 3,647,437; 3,635,707; 3,756,815, and Canadian Pat. Nos. 928,559 and 674,082. In these formats, the image-receiving layer containing the photographic image for viewing remains permanently attached and integral with the image generating and ancillary layers present in the structure when a transparent support is employed on the viewing side of the assemblage. The image is formed by dyes, produced in the image generating units, diffusing through the layers of the structure to a dye image-receiving layer comprising a mordant which binds the dye image thereto. After exposure of the assemblage, an alkaline processing composition permeates the various layers to initiate development of the exposed photosensitive silver halide emulsion layers. The emulsion layers are developed in proportion to the extent of the respective exposures, and the image dyes which are formed or released in the respective image generating layers begin to diffuse throughout the structure. At least a portion of the imagewise distribution of diffusible dyes diffuses to the dye image-receiving layer to form an image of the original subject.

The mordant for metallizable dyes in the receiving layer of an image transfer film unit plays a critical role. Ideally it must hold the metal ion to keep it from wandering through the imaging layers coated above the mordant. The image dye should diffuse to and metallize rapidly on the mordant to give a single dye species that is hue-stable over the pH range of 5–13.

U.S. Pat. Nos. 4,193,796 of Campbell et al and 4,239,847 of Archie et al. relate to various polymers for image-receiving layers which coordinate with metal ions. While these polymers are good for their intended purpose, it would be desirable to provide a polymer having a ligand which would rapidly and tightly bind metal and dye to it.

U.S. Pat. No. 4,282,305 of Brust et al. discloses a poly(4-vinylpyridine) mordant layer for an image receiving layer in diffusion transfer photography. A nickel salt used as a metallizing agent for the mordant must be coated in a separate layer, however, since nickel ions coagulate the poly(4-vinylpyridine) coating composition. This in turn causes problems since it is difficult to control metal ions wandering through the mordant layer. In addition, metallization rates of dye on this mordant are often slow, providing objectional hue shifts during processing. This will be illustrated by comparative tests hereinafter.

It would be desirable to provide a metallizing mordant which would not require a metal salt to be coated in a separate layer. It would also be desirable to provide a metallizing mordant which has a faster metallization rate, thereby reducing objectional hue shifts during processing.

These features are achieved in accordance with this invention of a photographic element comprising a support having thereon at least one photosensitive silver halide emulsion layer having associated therewith a dye image-providing material, the support also having thereon a dye image-receiving layer comprising a mordant which comprises a polymeric backbone having appended thereto nitrogen-coordinating ligands having the formula:

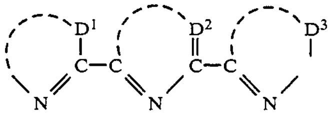

wherein $D^1$, $D^2$, and $D^3$ each independently represents the atoms necessary to complete an aromatic heterocyclic nucleus having at least one ring of 5 to 7 atoms.

Any polymeric backbone may be employed in the invention, as long as it has appended thereto the nitrogen-coordinating ligand described above. Such polymeric backbones are readily known to one skilled in the art.

In a preferred embodiment, the mordant of the invention is a polymer comprising recurring units having the formula:

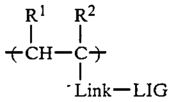

wherein:

$R^1$ and $R^2$ each independently represents hydrogen or an alkyl or substituted alkyl group having from 1 to about 6 carbon atoms;

Link represents a bivalent linking group; and

LIG represents a nitrogen-coordinating ligand having the formula:

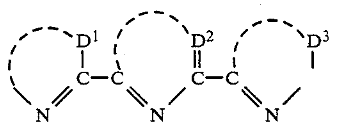

wherein $D^1$, $D^2$, and $D^3$ each independently represents the atoms necessary to complete an aromatic heterocyclic nucleus having at least one ring of 5 to 7 atoms. LIG may be attached to Link through any one of the $D^1$, $D^2$ or $D^3$ rings as desired. For ease of synthesis, however, LIG is preferably attached to Link through the $D^2$ ring.

In the above formula, $R^1$ and $R^2$ each independently represents hydrogen or an alkyl or substituted alkyl group having from 1 to about 6 carbon atoms such as methyl, ethyl, propyl, isobutyl, hexyl, chloropropyl, cyanobutyl and the like. In a preferred embodiment of the invention, $R^1$ is hydrogen, $R^2$ is hydrogen or methyl and the ligand is tridentate.

An image-receiving layer may contain the mordant polymer described above in its unmetallized form, in which case metal ions have to be supplied from a separate source or may be a part of a metallized dye diffusing to the mordant polymer. In a preferred embodiment, however, the mordant itself is a metal complex of the polymer described.

The metal complex can be formed during or after polymerization of the polymer as will be described hereinafter. Any hexacoordinate metal can be employed for the metal complex such as, for example, nickel(II), copper(II), zinc(II), platinum(II), palladium(II), cobalt(II) or cobalt(III). In a preferred embodiment, nickel(II) is employed. For example, a terpyridine derived polymer and nickel will rapidly form a 1:1 complex upon reaction with excess nickel acetate. A ternary dye-metal complex can then be formed by reaction of a released dye with the polymeric terpyridine-nickel complex.

In the absence of a terpyridine derived mordant of the invention, there is a tendency for many dyes to form 1:2 metal to dye complexes at high pH, and then to revert to 1:1 complexes at lower pH, thereby shifting the hue. Ternary terpyridine complexes of the invention are highly stable and retain nickel, for example, even at high pH, with disproportionation to the 1:2 metal/dye complex and nickel hydroxide occurring only at a very slow rate. Thus the hue of the dye on the mordant remains stabilized throughout a wide pH range.

The terpyridine derived mordant complexes of the invention provide a reactive form of nickel(II), for example, that promotes rapid dye metallization. A variety of dye-ligands metallize much faster with the terpyridine-nickel complex than with the mordant poly(4-vinylpyridine) and nickel acetate. This should both enhance adsorption and prevent desorption of the dye in the receiver, minimizing lateral diffusion and improving sharpness. Rapid metallization also ensures that the proper hue is obtained as the dye migrates, which is important for slow metallizing dyes.

In the above formula, Link can represent any bivalent linking group for linking LIG to the polymer backbone. Examples of useful linking groups include alkylene containing from 1 to about 6 carbon atoms such as methylene, ethylene, 2-methyl-1,2-propylene and the like; arylene containing 6 to about 10 carbon atoms such as phenylene, naphthylene, and the like; arylenealkylene containing about 7 to 11 carbon atoms such as phenylenemethylene; $COOR^3$ such as carboxyethylene; and $CONHR^3$ such as carbonyliminoethylene and 2-carbonylimino-2-methyl-1,2-propylene wherein $R^3$ is arylene, alkylene, or arylenealkylene as described above.

In a preferred embodiment of the invention, Link represents a bivalent linking group which includes

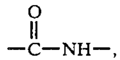, 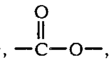, or 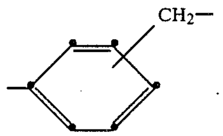.

In the above formula, $D^1$, $D^2$ and $D^3$ could each represent, for example, the atoms necessary to complete a substituted or unsubstituted pyridine ring, pyrimidine ring, thiazole ring, oxazole ring, selenazole ring, 2-quinoline ring, indolenine ring, imidazole ring, pyrazole ring or benzimidazole ring. In a preferred embodiment, $D^1$, $D^2$ and $D^3$ each independently represents the atoms necessary to complete a pyridine or substituted pyridine ring.

The mordant polymer of the invention may be either a homopolymer, a copolymer, terpolymer, etc. It may be polymerized with virtually any monomer as long as it does not deleteriously affect its mordanting ability or ability to complex with metal ions. There can be employed, for example, one or more $\alpha,\beta$-ethylenically unsaturated monomers such as acrylic esters, e.g., methyl methacrylate, butyl acrylate, butyl methacrylate, ethyl acrylate and cyclohexyl methacrylate; vinyl esters, such as vinyl acetate; amides, such as acrylamide, N-isopropylacrylamide, diacetone acrylamide, N-methylacrylamide and methacrylamide; nitriles, such as acrylonitrile, methacrylonitrile and vinylphenylacetonitrile; ketones, such as methyl vinyl ketone, ethyl vinyl ketone and p-vinylacetophenone; halides, such as vinyl chloride and vinylidene chloride; ethers, such as methyl vinyl ether, ethyl vinyl ether and vinylbenzyl methyl ether; $\alpha,\beta$-unsaturated acids, such as acrylic acid and methacrylic acid and other unsaturated acids such as vinylbenzoic acid; simple heterocyclic monomers, such as vinylpyridine and vinylpyrrolidone; olefins, such as ethylene, propylene, butylene and styrene as well as substituted styrene; diolefins, such as butadiene and 2,3-dimethylbutadiene, and other vinyl monomers within the knowledge and skill of an ordinary worker in the art.

In a preferred embodiment of the invention, the mordant polymer of the invention is copolymerized with acrylamide, methacrylamide, 2-hydroxyethyl acrylate, N-(3-methacrylamidopropyl)-N,N,N-trimethylammonium methosulfate, sodium 2-methacryloyloxyethane-1-sulfonate, sodium 2-acrylamido-2-methylpropane-1-sulfonate and N-(3-aminopropyl)methacrylamide hydrochloride. Good results have been obtained wherein the mordant polymer of the invention containing the tridentate ligand is present from about 2 to about 60 weight percent of the copolymer.

Conventional bulk, solution or bead vinyl addition polymerization techniques can also be used to prepare the polymers of this invention as described in M. P. Stevens, "Polymer Chemistry—An Introduction", Addison Wesley Publishing Company, Reading, Mass. (1975), the disclosure of which is hereby incorporated by reference. The terpyridine derived mordant polymers of the invention may be prepared in two different manners: (a) reaction of a preferred homo- or copolymer having a reactive group with an appropriate terpyridine derivative or (b) by polymerization of a suitable terpyridine-containing monomer.
Examples of novel polymers within the scope of the invention include the following:
$$-(A)_x-(B)_y-(C)_z-$$
tPy = 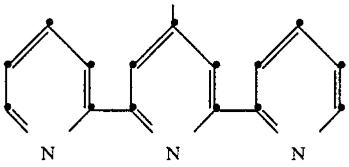
| Compound | A | B | C | x | y | z |
|---|---|---|---|---|---|---|
| 1 | 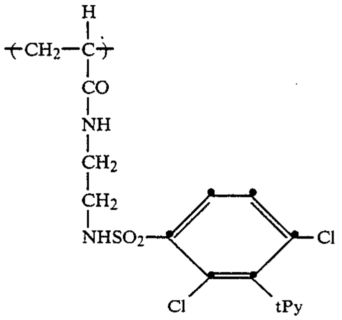 | 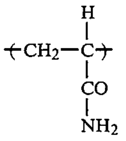 | — | 20 | 80 | 0 |
| 2 | 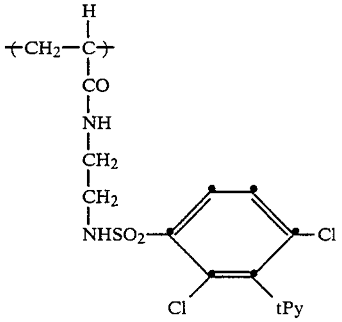 | 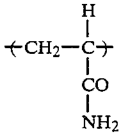 | — | 30 | 70 | 0 |
| 3 | 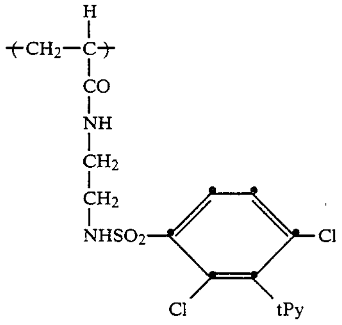 | 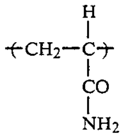 | — | 40 | 60 | 0 |
| 4 | 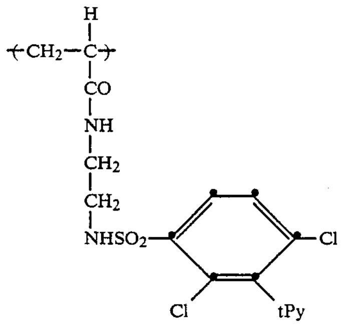 | 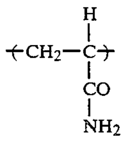 | 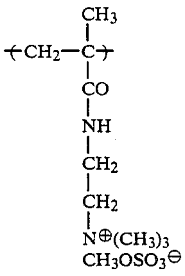 | 25 | 50 | 25 |

-continued
$-(A)_x-(B)_y-(C)_z-$
tPy = 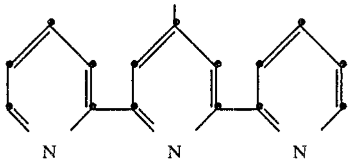
| Compound | A | B | C | x | y | z |
|---|---|---|---|---|---|---|
| 5 | 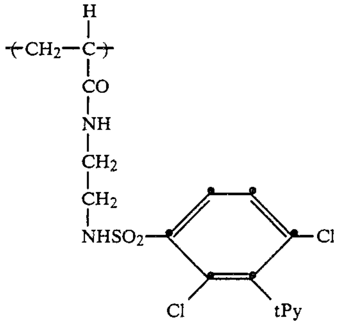 | 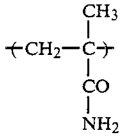 | 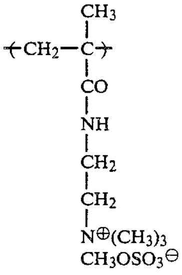 | 40 | 40 | 20 |
| 6 | 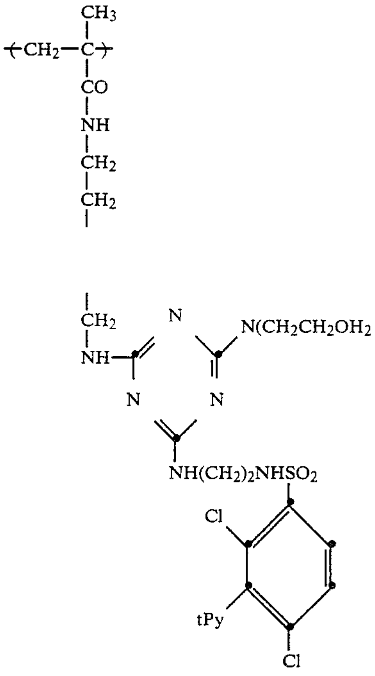 | 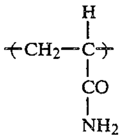 | — | 10 | 90 | 0 |
| 7 | 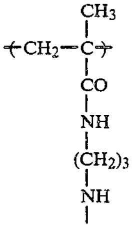 | 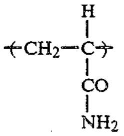 | — | 25 | 75 | 0 |

-continued
$-(A)_x-(B)_y-(C)_z-$
tPy = 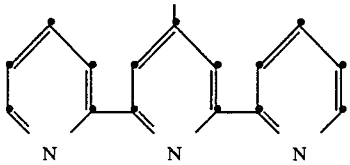
| Compound | A | B | C | x | y | z |
|---|---|---|---|---|---|---|
| | 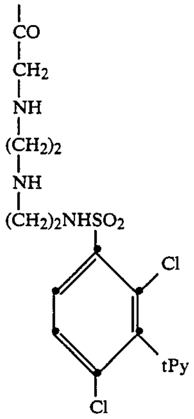 | | | | | |
| 8 | 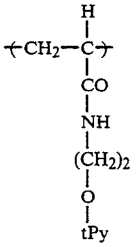 | 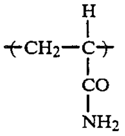 | 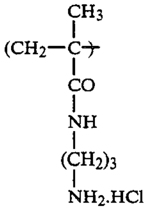 | 20 | 75 | 5 |
| 9 | 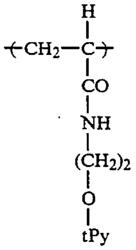 | 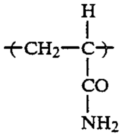 | 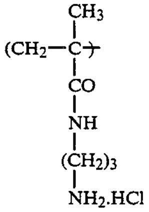 | 30 | 65 | 5 |
| 10 | 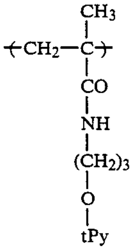 | 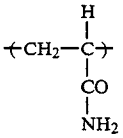 | 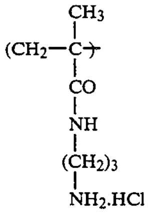 | 20 | 75 | 5 |
| 11 | 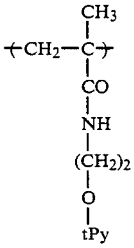 | 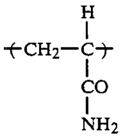 | 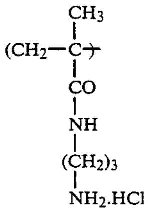 | 30 | 65 | 5 |

-continued
$-(A)_x-(B)_y-(C)_z-$
tPy = 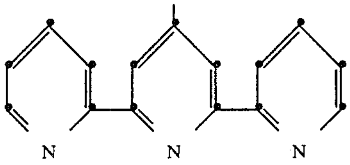
| Compound | A | B | C | x | y | z |
|---|---|---|---|---|---|---|
| 12 | 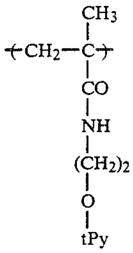 | 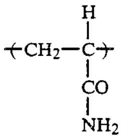 | 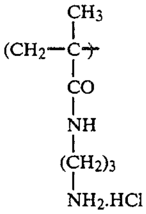 | 30 | 69 | 1 |
| 13 | 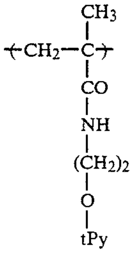 | 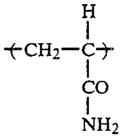 | 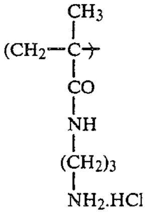 | 20 | 70 | 10 |
| 14 | 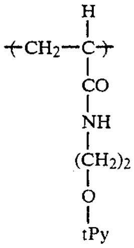 | 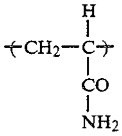 | — | 10 | 90 | 0 |
| 15 | 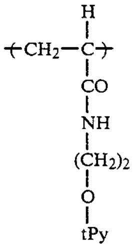 | 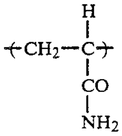 | — | 20 | 80 | 0 |
| 16 | 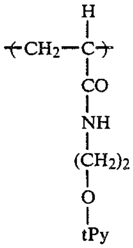 | 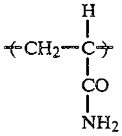 | — | 30 | 70 | 0 |

-continued
$-(A)_x-(B)_y-(C)_z-$
tPy = 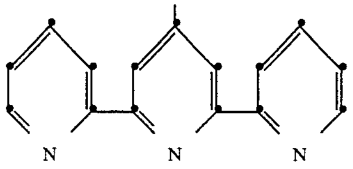
| Compound | A | B | C | x | y | z |
|---|---|---|---|---|---|---|
| 17 | 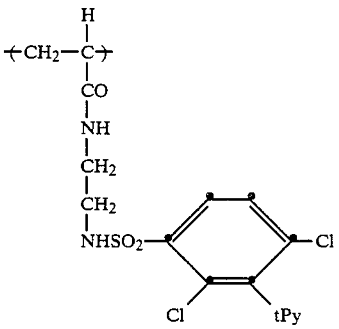 | 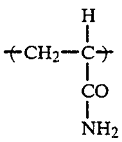 | 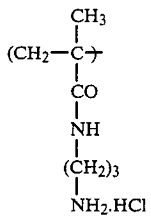 | 30 | 60 | 10 |
| 18 | 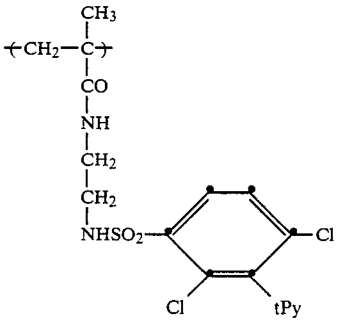 | 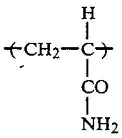 | 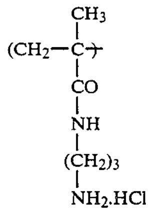 | 30 | 65 | 5 |
| 19 | 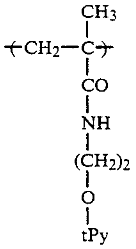 | 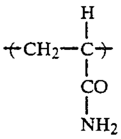 | — | 40 | 60 | 0 |
| 20 | 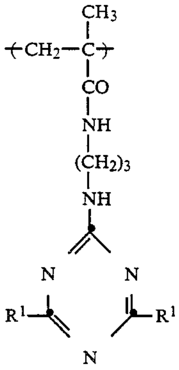 | 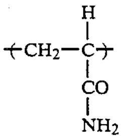 | — | 10 | 90 | 0 |
where $R^1$ =

-continued
$-(A)_x-(B)_y-(C)_z-$
tPy = 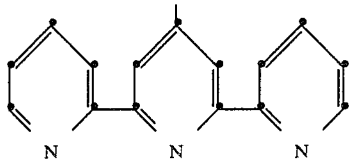
| Compound | A | B | C | x | y | z |
| --- | --- | --- | --- | --- | --- | --- |
| | 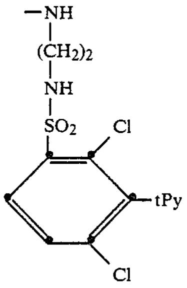 | | | | | |
| 21 | 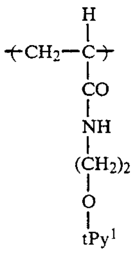 | 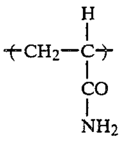 | — | 20 | 80 | 0 |
| 22 | 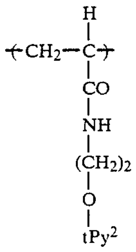 | 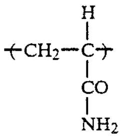 | — | 20 | 80 | 0 |
| 23 | 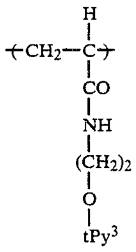 | 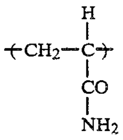 | — | 20 | 80 | 0 |

-continued $-(A)_x-(B)_y-(C)_z-$ tPy = 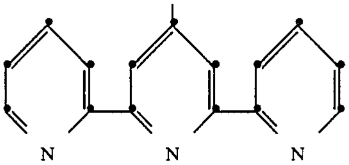

| Compound | A | B | C | x | y | z |
|---|---|---|---|---|---|---|
| 24 | 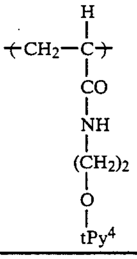 | 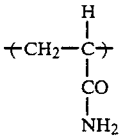 | — | 20 | 80 | 0 |

tPy[1] is 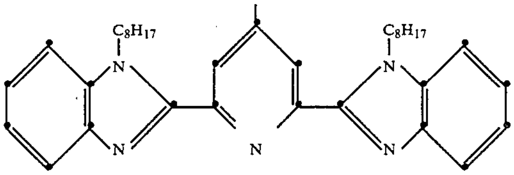

tPy[2] is 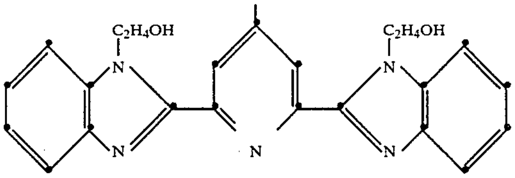

tPy[3] is 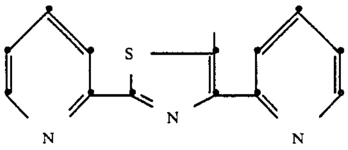

tPy[4] is 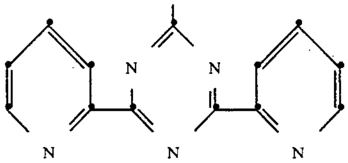

The photographic element described above can be treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic assemblage in accordance with this invention comprises:

(a) a support having thereon at least one photosensitive silver halide emulsion layer having associated therewith a dye image-providing material;

(b) an alkaline processing composition and means containing same for discharge within said assemblage; and (c) a dye image-receiving layer comprising a mordant as described above.

The alkaline processing composition can be contained, for example, in a rupturable container which is adapted to be positioned so that during processing of the film unit, a compressive force applied to the container by pressure-applying members, such as would be found in a camera designed for in-camera processing, will effect a discharge of the container's contents within the film unit.

The dye image-providing material useful in this invention is either positive- or negative-working, and is either initially mobile or immobile in the photographic element during processing with an alkaline composition. Examples of initially mobile, positive-working dye image-providing materials useful in this invention are described in U.S. Pat. Nos. 2,983,606; 3,536,739; 3,705,184; 3,482,972; 2,756,142; 3,880,658 and 3,854,985. Examples of negative-working dye image-providing materials useful in this invention include conventional couplers which react with oxidized aromatic primary amino color developing agents to produce or release a dye such as those described, for example, in U.S. Pat. No. 3,227,550 and Canadian Pat. No. 602,607. In a preferred embodiment of this invention, the dye image-providing material is a ballasted, redox-dye-releasing (RDR) compound. Such compounds are well known to those skilled in the art and are, generally speaking, compounds which will react with oxidized or unoxidized developing agent or electron transfer agent to release a dye. Such nondiffusible RDR's include negative-working compounds, as described in U.S. Pat. Nos. 3,728,113 of Becker et al.; 3,725,062 of Anderson and Lum; 3,698,897 of Gompf and Lum; 3,628,952 of Puschel et al.; 3,443,939 and 3,443,940 of Bloom et al.; 4,053,312 of Fleckenstein; 4,076,529 of Fleckenstein et al.; 4,055,428 of Koyama et al.; 4,149,892 of Deguchi et al.; 4,198,235 and 4,179,291 of Vetter et al.; *Research Disclosure* 15157, November, 1976 and *Research Disclosure* 15654, April, 1977.

Such nondiffusible RDR's also include positive-working compounds, as described in U.S. Pat. Nos. 3,980,479; 4,139,379; 4,139,389; 4,199,354, 4,232,107, 4,199,355 and German Pat. No. 2,854,946, the disclosures of which are hereby incorporated by reference.

In a preferred embodiment of the invention, RDR's such as those in the Fleckenstein et al. patent referred to above are employed. Such compounds are ballasted sulfonamido compounds which are alkalicleavable upon oxidation to release a diffusible dye from the nucleus and have the formula:

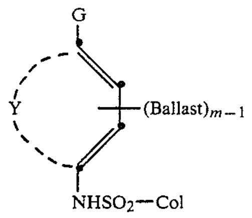

wherein:

(a) Col is a dye or dye precursor moiety;

(b) Ballast is an organic ballasting radical of such molecular size and configuration (e.g., simple organic groups or polymeric groups) as to render the compound nondiffusible in the photosensitive element during development in an alkaline processing composition;

(c) G is $OR^4$ or $NHR^5$ wherein $R^4$ is hydrogen or a hydrolyzable moiety and $R^5$ is hydrogen or a substituted or unsubstituted alkyl group of 1 to 22 carbon atoms, such as methyl, ethyl, hydroxyethyl, propyl, butyl, secondary butyl, tertiary butyl, cyclopropyl, 4-chlorobutyl, cyclobutyl, 4-nitroamyl, hexyl, cyclohexyl, octyl, decyl, octadecyl, docosyl, benzyl or phenethyl (when $R^5$ is an alkyl group of greater than 6 carbon atoms, it can serve as a partial or sole Ballast group);

(d) Y represents the atoms necessary to complete a benzene nucleus, a naphthalene nucleus or a 5- to 7-membered heterocyclic ring such as pyrazolone or pyrimidine; and (e) m is a positive integer or 1 to 2 and is 2 when G is $OR^4$ or when $R^5$ is a hydrogen or an alkyl group of less than 8 carbon atoms.

For further details concerning the above-described sulfonamido compounds and specific examples of same, reference is made to the above-mentioned Fleckenstein et al U.S. Pat. No. 4,076,529.

In another preferred embodiment of the invention, positive-working, nondiffusible RDR's of the type disclosed in U.S. Pat. Nos. 4,139,379 and 4,139,389 are employed. In this embodiment, an immobile compound is employed which as incorporated in a photographic element is incapable of releasing a diffusible dye. However, during photographic processing under alkaline conditions, the compound is capable of accepting at least one electron (i.e., being reduced) and thereafter releases a diffusible dye. These immobile compounds are ballasted electron accepting nucleophilic displacement compounds.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819.

In another embodiment, the dye image-receiving layer in the above-described film assemblage is integral with the photographic element and is located between the support and the lowermost photosensitive silver halide emulsion layer. One useful format for integral negative-receiver photographic elements is disclosed in Belgian Pat. No. 757,960. In such an embodiment, the support for the photographic element is transparent and is coated with a dye image-receiving layer as described above, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer, and dye images, formed as a function of development, diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is useful is disclosed in Canadian Pat. No. 928,559. In this embodiment, the support for the photographic element is transparent and is coated with the dye image-receiving layer described above, a substantially opaque, light-reflective layer and the photosensitive layer or layers described above. A rupturable container, containing an alkaline processing composition and an opacifier, is positioned between the top layer and a transparent cover sheet which has thereon, in sequence, a neutralizing layer, and a timing layer. The film unit is placed in a camera, exposed through the transparent cover sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images, formed as a result of development, diffuse to the image-receiving layer to provide a positive, right-reading image which is viewed through the transparent support on the opaque reflecting layer background. The dye image-receiving layer may then be stripped away from the rest of the assemblage, if desired. For further details concerning the format of this particular integral film unit, reference is made to the above-mentioned Canadian Patent 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also contains a neutralizing layer and a timing layer underneath the dye image-receiving layer.

In another embodiment of the invention, a neutralizing layer and timing layer are located underneath the photosensitive layer or layers. In that embodiment, the photographic element would comprise a support having thereon, in sequence, a neutralizing layer, a timing layer and at least one photosensitive silver halide emulsion layer having associated therewith a dye image-providing material. A dye image-receiving layer as described above would be provided on a second support with the processing composition being applied therebetween. This format could either be integral or peel-apart as described above.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

A process for producing a photographic transfer image in color according to the invention from an imagewise-exposed photosensitive element comprising a support having thereon at least one photosensitive silver halide emulsion layer having associated therewith a dye image-providing material, comprises treating the element with an alkaline processing composition in the presence of a silver halide developing agent to effect development of each of the exposed silver halide emulsion layers. An imagewise distribution of dye image-providing material is formed as a function of development and at least a portion of it diffuses to a dye image-receiving layer to provide the transfer image.

The film unit or assemblage of the present invention is used to produce positive images in single or multicolors. In a three-color system, each silver halide emulsion layer of the film assembly will have associated therewith a dye image-providing material which possesses a predominant spectral absorption within the region of the visible spectrum to which said silver halide emulsion is sensitive, i.e., the blue-sensitive silver halide emulsion layer will have a yellow dye image-providing material associated therewith, the green-sensitive silver halide emulsion layer will have a magenta dye image-providing material associated therewith and the red-sensitive silver halide emulsion layer will have a cyan dye image-providing material associated therewith. The dye image-providing material associated with each silver halide emulsion layer is contained either in the silver halide emulsion layer itself or in a layer contiguous to the silver halide emulsion layer, i.e., the dye image-providing material can be coated in a separate layer underneath the silver halide emulsion layer with respect to the exposure direction.

The concentration of the dye image-providing material that is employed in the present invention can be varied over a wide range, depending upon the particular compound employed and the results desired. For example, the dye image-providing material coated in a layer at a concentration of 0.1 to 3 $g/m^2$ has been found to be useful. The dye image-providing material is usually dispersed in a hydrophilic film forming natural material or synthetic polymer, such as gelatin, polyvinyl alcohol, etc, which is adapted to be permeated by aqueous alkaline processing composition.

A variety of silver halide developing agents are useful in this invention. Specific examples of developers or electron transfer agents (ETA's) useful in this invention include hydroquinone compounds, aminophenol compounds, catechol compounds, 3-pyrazolidinone compounds, such as those disclosed in column 16 of U.S. Pat. No. 4,358,527, issued Nov. 9, 1982. A combination of different ETA's, such as those disclosed in U.S. Pat. No. 3,039,869, can also be employed. These ETA's are employed in the liquid processing composition or contained, at least in part, in any layer or layers of the photographic element or film assemblage to be activated by the alkaline processing composition, such as in the silver halide emulsion layers, the dye image-providing material layers, interlayers, image-receiving layer, etc.

In the invention, dye image-providing materials can be used which produce diffusible dye images as a function of development. Either conventional negative-working or direct-positive silver halide emulsions are employed. If the silver halide emulsion employed is a direct-positive silver halide emulsion, such as an internal image emulsion designed for use in the internal image reversal process, or a fogged, direct-positive emulsion such as a solarizing emulsion, which is developable in unexposed areas, a positive image can be obtained on the dye image-receiving layer by using negative-working ballasted, redox dye-releasers. After exposure of the film assemblage or unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-initiated reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiving to stabilize the image.

Internal image silver halide emulsions useful in this invention are described more fully in the November, 1976 edition of *Research Disclosure,* pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November, 1976 edition of *Research Disclosure,* the disclosure of which is hereby incorporated by reference.

The dye image-receiving layers containing the novel mordants of this invention may also contain a polymeric vehicle as long as it is compatible therewith. Suitable materials are disclosed, for example, in U.S. Pat. No. 3,958,995, and in *Product Licensing Index,* 92, December, 1971, Publ. No. 9232; page 108, paragraph VIII, the disclosures of which are hereby incorporated by reference.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July, 1974 edition of *Research Disclosure,* and pages 35 through 37 of the July 1975 edition of *Research Disclosure,* the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g, alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November, 1976 edition of *Research Disclosure,* the disclosure of which is hereby incorporated by reference.

The alkaline solution permeable, substantially opaque, light-reflective layer employed in certain embodiments of photographic film units used in this invention is described more fully in the November, 1976 edition of *Research Disclosure,* page 82, the disclosure of which is hereby incorporated by reference.

The supports for the photographic elements used in this invention can be any material, as long as it does not deleteriously affect the photographic properties of the film unit and is dimensionally stable. Typical flexible sheet materials are described on page 85 of the November, 1976 edition of *Research Disclosure,* the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore U.S. Pat. No. 4,362,806, issued Dec. 7, 1982.

The silver halide emulsions useful in this invention, both negative-working and direct-positive ones, are well known to those skilled in the art and are described in *Research Disclosure,* Volume 176, December, 1978, Item 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized againts loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference. *Research Disclosure* and *Product Licensing Index* are publications of Industrial Opportunities Ltd.; Homewell, Havant; Hampshire, P09 1EF, United Kingdom.

The term "nondiffusing" used herein has the meaning commonly applied to the term in photography and denotes materials that for all practical purposes do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

SYNTHESIS EXAMPLE 1

Preparation of Compound 20

Poly(acrylamide-co-N-(3-(4,6-bis(2-(2,4-dichloro-3-(2,2':6',2"-terpyridin-4'-yl)benzenesulfonamido)ethylamino)-1,3,5-triazin-2-ylamino)propyl)methacrylamide)Ni(II) complex A. Preparation of the intermediate: 4,6-Dichloro-2-(3-methacrylamidopropylamino)-s-triazine

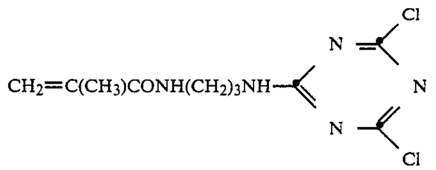

A mixture of N-(3-aminopropyl)methacrylamide hydrochloride (144 g, 0.8 moles) in water (2.4 l) and sodium bicarbonate (136 g, 1.6 moles) was cooled to 0° C. and cyanuric chloride (148 g, 0.8 moles) in acetone (800 ml) was added. Sodium bicarbonate (136 g, 1.6 moles) was then added in four equal portions every 15 minutes. The solution was then stirred for one hour at room temperature and the resulting solution filtered. The solid was recrystallized from ethyl acetate (1 l) with 1 g of hydroquinone as inhibitor, filtered and cooled in the freezer. The yield of white solid product obtained by filtering was 45 percent, m.p. 139°-140° C.

B. Preparation of the intermediate copolymer with acrylamide

To a solution of acrylamide (54 g, 0.76 moles), 4,6-dichloro-2-(3-methacrylamidopropylamino)-s-triazine (6.0 g, 0.02 moles) (as prepared above) in a mixture of t-butyl alcohol (420 ml) and methanol (120 ml) was added 2,2'-azobis(2-methylpropionitrile) (400 mg) as initiator. This mixture was heated at 60° C. under nitrogen; the polymer precipitated and after five hours was filtered, washed with methanol (1 l), and vacuum filtered. Yield: 100 percent. The polymer had an inherent viscosity of 0.62 dl/g in 0.1N sodium chloride solution. Percent Cl (calculated): 2.36; (found): 2.70.

C. Ligand Synthesis

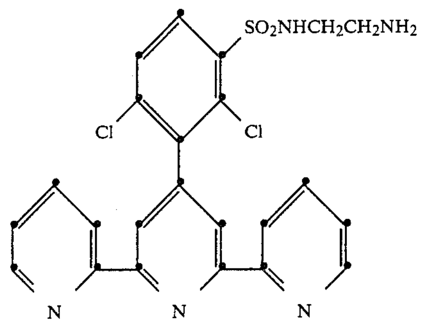

4'-(2,6-Dichloro-3-(2-amino ethylsulfamoyl)phenyl)2,2':6',2"-terpyridine

Potassium hydroxide (4.0 g) was added to a mixture of 2,6-dichlorobenzaldehyde (40.0 g), 2-acetylpyridine (28.0 g) and methanol (500 ml). The mixture was stirred at room temperature for 4 hours, cooled to 0° C. and filtered. The pale yellow precipitate was washed with cold methanol and air dried to yield 51.8 g (82 percent) of desired pure product, 1-(2-pyridyl)-3-(2,6-dichlorophenyl)propenone.

To a solution of methanol (300 ml) and acetic acid (120 ml) was added 1-(2-pyridyl)-3-(2,6-dichlorophenyl)propenone (18.0 g) and N-(2-pyridylcarbonylmethyl)pyridinium iodide (21.0 g). Ammonium acetate (120 g) was then added and the solution was refluxed under nitrogen for 20 hours. The flask was cooled in an ice bath for several hours and the resulting solid was filtered off, washed with cold methanol and air dried. Yield: 16.4 g (66 percent) of desired pure product, 4'-(2,6-dichlorophenyl)-2,2':6',2"-terpyridine.

The previously prepared 'terpyridine' (10.0 g) was added in small portions to chlorosulfonic acid (20 ml). This solution was warmed to 120° C. for 5 hours. The solution was cooled and then carefully and slowly poured onto a minimum volume (50 g) of ice. As the ice was consumed, the flask was recooled in a dry-ice-acetone bath until all the solution was added. The solid was filtered, washed with a minimum of ice water and air dried to give 12.1 g of product. Formation of the sulfonyl chloride was verified by its infrared spectrum.

The sulfonyl chloride prepared above (12.1 g) was slowly added to a mixture of ethylenediamine (30 ml) in tetrahydrofuran (100 ml) and refluxed for 2 hours. The mixture was cooled, about 50 ml of tetrahydrofuran was removed by vacuum. This solution was poured into 500 ml ice water to precipitate product. After filtration and washing with distilled water, the solid was suspended in refluxing ethanol for 20 minutes and cooled. The yield was 7.6 g (72 percent) (m.p. 298° C.)

D. Preparation of the derived Ni(II) terpyridine polymer

4'-(2,6-Dichloro-3-(2-aminoethylsulfamoyl)phenyl)-2,2':6',2"-terpyridine (20.0 g, 0.04 moles) (prepared in C above) was dissolved in dimethyl sulfoxide (250 ml) and filtered to remove insoluble material. To a solution of the polymer of Part B above (60 g, 0.020 mole) in dimethyl sulfoxide (650 ml), the terpyridine solution and N,N-diisopropylethylamine (5.2 g, 0.04 mole) were added dropwise over 1 hour at 70°-75° C. The solution was stirred and heated at this temperature overnight under nitrogen. Diethanolamine (2.0 g, 0.02 moles) in dimethyl sulfoxide (25 ml) was then added to the above solution at 70°-75° C. and heating was continued for five hours. The reaction mixture was slowly added over two hours to a stirred solution of filtered nickelous acetate (80.0 g, 0.32 moles) in dimethyl sulfoxide (2 l). The mixture was heated with stirring at 70° C. overnight. Water (2 l) was added and the polymer was purified by diafiltration (10 passes) to give 3.8 percent solids. This polymer contained 1.7 percent by weight nickel ion.

SYNTHESIS EXAMPLE 2

Preparation of Compound 9

Poly(acrylamide-co-4'-(2-acrylamidoethoxy)-2,2':6',2"-terpyridine-co-N-(3-aminopropyl)methacrylamide hydrochloride) Ni(II) complex A. Preparation of the intermediate: 4'-(2-Acrylamidoethoxy)-2,2':6',2"-terpyridine

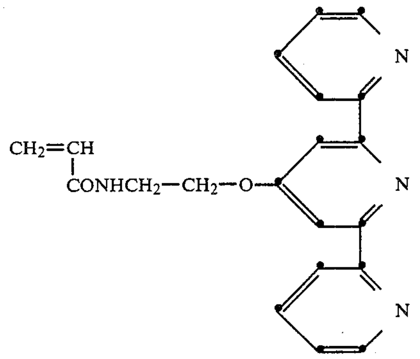

4'-Methylthio-2,2':6',2"-terpyridine (25. g) (prepared in two steps from 2-acetylpyridine as described by K. T. Potts, et al., J. Org. Chem., 47, 3027 (1982)) was suspended in methanol (500 ml) containing acetic acid (75 ml) and sodium acetate (40 g). Sunny Sol ® bleach (325 g, containing 5.3 percent available chlorine by weight as sodium hypochlorite) was added dropwise with stirring over 90 minutes, keeping the temperature below 20° C. by cooling. The mixture was then diluted with water to 2 l and filtered. The crude product was slurried with ethanol (250 ml) to dissolve impurities and filtered. The yield of the methylsulfonyl derivative was 18.2 g.

A mixture of tetrahydrofuran distilled from lithium aluminum hydride (300 ml), ethanolamine vacuum distilled into 4A molecular sieves (8.9 g) and potassium t-butoxide (13.5 g) was stirred at room temperature for 20 minutes. Solid 4'-methylsulfonyl-2,2':6',2"-terpyridine (25.0 g) was then added and the solution allowed to stir at room temperature for 4 hours. The solution was filtered to remove potassium methanesulfinic acid and concentrated to dryness. The solid obtained was redissolved in acetonitrile (150 ml), filtered while hot, and then cooled to give 18.4 g of product. (m.p. 134°-137° C.)

To a solution of the above-prepared 4'-(2-aminoethoxy)-2,2':6',2"-terpyridine (40.0 g, 0.14 moles), hydroquinone (100 mg) and triethylamine (14.0 g, 0.14 mole) in dichloromethane (700 ml), acryloyl chloride (13.0 g, 0.14 mole) was added dropwise at 0°-5° C. The reaction was stirred at room temperature for one hour and then heated to 50° C. for 60 minutes. The mixture was then washed twice with water (200 ml portions), dried over anhydrous magnesium sulfate and filtered. Absolute ethanol (350 ml) was added, and the mixture was concentrated to approximately 350 ml on a rotary evaporator until white solid began to form. The solution was then placed in the freezer overnight and filtered. The yield of pure monomer was 75 percent, m.p. 168°-170° C. Percent analysis (calculated): C, 69.3; H, 5.2; N, 16.2; (found): C, 69.1; H, 5.3; N, 16.1.

To a solution of acrylamide (39.0 g, 0.55 moles), 4'-(2-acrylamidoethoxy)-2,2':6',2''-terpyridine (18.0 g, 0.052 moles), N-(3-aminopropyl)methacrylamide hydrochloride (3.0 g, 0.017 moles) in t-butyl alcohol (420 ml) and methanol (120 ml) was added 2,2'-azobis(2-methylpropionitrile) (300 mg) as initiator. This mixture was heated at 65°-70° C. under nitrogen for three hours. The precipitated polymer was filtered and dried under vacuum for two hours. The yield was 100 percent. The polymer had an inherent viscosity of 0.38 dl/g in a 0.1M solution of tetrabutylammonium bromide in dimethylsulfoxide.

The polymer prepared above was dissolved in water (800 ml) and acetic acid (4.0 g, 0.067 mole) and then purified by diafiltration (5 passes) to give a solution having 1.2 percent solids (26 g) and pH=3.75. The diafiltered polymer was then added dropwise at room temperature over two hours to nickelous acetate (22.0 g, 0.088 mole) in water (1 l) and was stirred at room temperature an additional two hours. The polymer solution was purified by diafiltration (10 passes) to give a solution having 5.1 percent solids (21.4 g). The solution was adjusted to pH 6.0 with dilute acetic acid. The yield was 80 percent. The polymer had a nickel ion content of 3.4 percent. Other polymers of related structure were prepared by varying the weight proportions of acrylamide/terpyridine ligand/amine hydrochloride as follows:

| | |
|---|---|
| Compound 12 | 69/30/1 |
| Compound 8 | 75/20/5 |
| Compound 14 | 90/10/0 |
| Compound 15 | 80/20/0 |
| Compound 16 | 70/30/0 |

SYNTHESIS EXAMPLE 3

Preparation of Compound 5

Poly(acrylamide-co-N-(3-methacrylamidopropyl)-N,N,N-trimethylammonium methosulfate-co-N-(2-acrylamidoethyl)-2,4-dichloro-3-(2,2':6',2''-terpyridin-4'-yl)benzenesulfonamide) Ni(II) complex

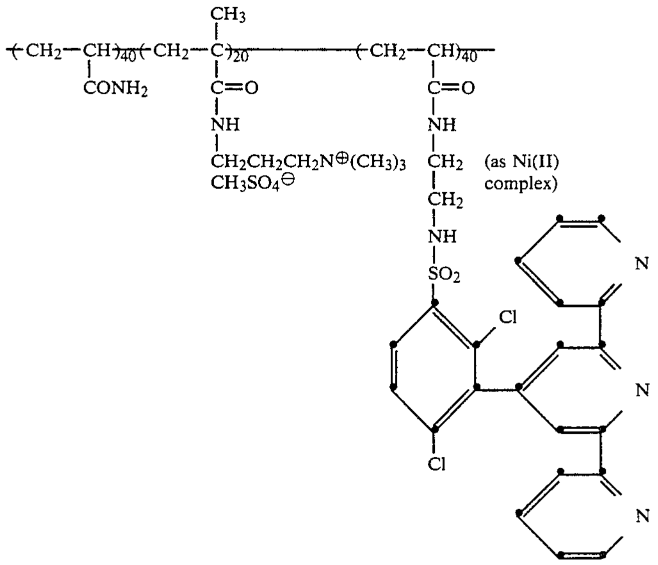

Preparation of the monomer intermediate: N-(2-acrylamidoethyl)-2,4-dichloro-3-(2,2':6',2''-terpyridin-4'-yl)benzenesulfonamide To a solution of 2,6-bis(2-pyridyl)-4-[2,6-dichloro-3-(2-aminoethylsulfamoyl)phenyl]pyridine (136 g, 0.28 mole), hydroquinone (300 mg) and triethylamine (30 g, 0.30 mole) in N,N-dimethylformamide (1200 ml), was added dropwise at 0°-10° C. acryloyl chloride (27.0 g, 0.30 mole). The reaction was stirred at room temperature for two hours and then heated to 50° C. for 30 to 60 minutes. The mixture was then poured into ice water, filtered and washed several times with water. The solid was suspended in tetrahydrofuran (1000 ml), and concentrated on a rotary evaporaator to about 250 ml. Ethanol (250 ml) was added, and the solution was placed in a freezer overnight to precipitate the pure monomer. The yield of white solid product obtained by filtering was 48 percent. Percent analysis (calculated): C, 56.3; H, 3.8; Cl, 12.8; N, 12.6; S, 5.8; (found): C, 56.3; H, 4.1; Cl, 12.5; N, 12.0; S, 5.8. The structure was confirmed by NMR and mass spectrometry.

A mixture of acrylamide (16.0 g, 0.225 mole), N-(3-methacrylamidopropyl)-N,N,N-trimethylammonium methosulfate (8.0 g, 0.027 mole), monomer intermediate (16.0 g, 0.028 mole) and 2,2'-azobis(2-methylpropionitrile) (200 mg) in dimethyl sulfoxide (160 ml) was maintained under a nitrogen atmosphere and heated for one hour at 70° C. under nitrogen. Additional dimethyl sulfoxide (200 ml) was added and heating was continued for two hours. The reaction mixture was then slowly added over one hour to a stirred solution of nickelous acetate (21.6 g, 0.087 moles) in dimethyl sulfoxide (750 ml) and heated overnight at 70° C. with stirring. Water was added (2 l) and the polymer was purified by diafiltration (7 passes) to give a solution of 2.1 percent solids. The solution was adjusted to a pH of 5.6 with dilute acetic acid. The yield was 50 percent. This polymer was found to contain 2.9 percent by weight of nickel.

Other polymers of related structure were prepared by this same procedure varying the weight proportions of acrylamide/terpyridine and omitting the ammonium methosulfate monomer.

Photographic Example—Dye Metallization (A) A receiving element was prepared by coating the following layers on a transparent poly(ethylene)terephthalate film support:

(1) Dye image-receiver layer of a nickel complex of Compound 1 equivalent to 0.13 $g/m^2$ nickel;
(2) Reflecting layer of titanium dioxide (23 $g/m^2$) and gelatin (3.2 $g/m^2$); and
(3) Overcoat layer of gelatin (5.4 $g/m^2$).

Similar receiving elements were prepared for compounds 3, 4, 7, 9, 13 and 17.

(B) A control receiving element was prepared by coating the following layers on a transparent poly(ethylene)terephthalate film support. Coverages are parenthetically stated in $g/m^2$.

(1) Metallizing layer of nickel nitrate hexahydrate (0.65), poly(acrylamide-co-N-(3-aminopropyl)methacrylamide) (1.1);
(2) Dye image-receiving layer of poly(4-vinylpyridine) (2.2) and poly(acrylamide-co-N-(3-aminopropyl)methacrylamide (2.2);
(3) Reflecting layer of titanium dioxide (23) and gelatin (2.3); and
(4) Overcoat of gelatin (5.4).

Metallizable dye elements were prepared by coating on a transparent poly(ethylene terephthalate) film support each of the following dyes at 0.14 $g/m^2$ in 3.2 $g/m^2$ of gelatin:

I.

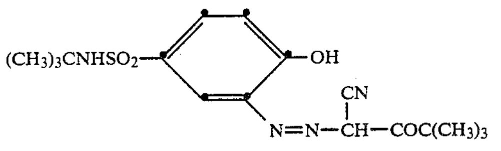

II.

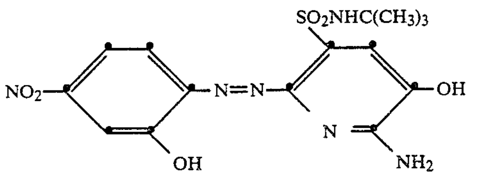

A pod was prepared consisting of 56 g/l of potassium hydroxide and 35 g/l carboxymethylcellulose.

The effectiveness of the mordants described above for dye metallization was evaluated. A coating containing one of the metallizable dyes in gelatin was laminated to a mordant receiver sheet by spreading the contents of the viscous pod between a pair of 100 μm fluid gap juxtaposed rollers. The reflection density and spectra of the dye transferred to the receiver were read on a scanning spectrophotometer at 90 sec intervals (changes of λ-max of the transferred dye with time are an indication of the rate of metallization; density changes with time are an indication of rate of total dye transferred).

The following results were obtained:

| Dye | Polymer Mordant | Shift of dye λ-max from final λ-max (nm) @ | | | | | | Final λ-max |
|---|---|---|---|---|---|---|---|---|
| Transferred | Compound | 30 sec | 120 sec | 3.5 min | 5 min | 10.5 min | 15 min | 24 hr (nm) |
| I | 1 | 8 | 0 | 0 | 0 | 0 | 0 | 460 |
| I | 3 | 7 | 1 | 2 | 4 | 4 | 4 | 457 |
| I | 4 | 8 | 0 | 2 | 2 | 2 | 2 | 460 |
| I | 7 | 10 | 2 | 0 | 0 | 0 | 0 | 457 |
| I | 9 | 21 | 11 | 1 | 1 | 1 | 1 | 456 |
| I | 13 | 12 | 1 | 0 | 0 | 0 | 0 | 457 |
| I | 17 | 15 | 1 | 1 | 1 | 1 | 1 | 459 |
| I | Control | 25 | 19 | 12 | 12 | 12 | 7 | 457 |
| I | Repeat Control | 24 | 18 | 13 | 10 | 18 | 18 | 455 |
| II | 1 | 25 | 15 | 10 | 10 | 5 | 7 | 660 |
| II | 4 | 25 | 13 | 10 | 10 | 5 | 5 | 660 |
| II | 7 | 24 | 10 | 8 | 5 | 1 | 1 | 656 |
| II | 9 | 26 | 15 | 6 | 7 | 0 | 0 | 657 |
| II | Control | 54 | 11 | 4 | 9 | 9 | 9 | 666 |
| II | Repeat Control | 100 | 25 | 5 | 6 | 12 | 10 | 665 |

The data obtained show less variance of λ-max with time and more rapid approach of the final λ-max with the mordant polymers of the invention than with the controls for a variety of transferred dyes, indicating more complete and rapid dye metallization. Differences of less than 5 nm are insignificant as can be seen from the variance of the final λ-max values. The metallizable dye used would normally be part of a redox dye releaser as described above.

The invention has been described in detail with particular reference to preferred embodiments thereof, but it will be understood that variations and modifications can be effected within the spirit and scope of the invention.

What is claimed is:

1. A polymer comprising a polymeric backbone having appended thereto nitrogen-coordinating ligands having the formula:

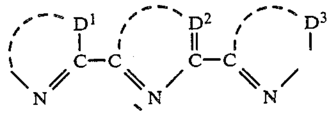

wherein $D^1$, $D^2$, and $D^3$ each independently represents the atoms necessary to complete an aromatic heterocyclic nucleus having at least one ring of 5 to 7 atoms.

2. The polymer of claim 1 which comprises recurring units having the formula:

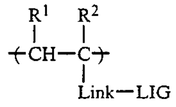

wherein:

$R^1$ and $R^2$ each independently represents hydrogen or an alkyl or substituted alkyl group having from 1 to about 6 carbon atoms;

Link represents a bivalent linking group; and

LIG represents a nitrogen-coordinating ligand having the formula:

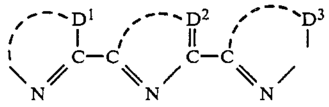

wherein $D^1$, $D^2$, and $D^3$ each independently represents the atoms necessary to complete an aromatic heterocyclic nucleus having at least one ring of 5 to 7 atoms.

3. The polymer of claim 2 which is a metal complex.

4. The polymer of claim 3 wherein $R^1$ is hydrogen, $R^2$ is hydrogen or methyl and the ligand is tridentate.

5. The polymer of claim 3 wherein Link includes

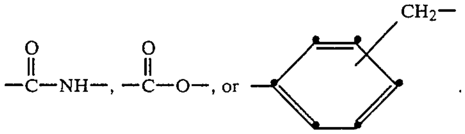

6. The polymer of claim 3 wherein $D^1$, $D^2$ and $D^3$ each independently represent the atoms necessary to complete a pyridine or substituted pyridine ring.

7. The polymer of claim 3 in which the recurring units are copolymerized with one or more of acrylamide, methacrylamide, 2-hydroxyethyl acrylate, N-(3-methacrylamidopropyl)-N,N,N-trimethylammonium methosulfate, sodium 2-methacryloyloxyethane-1-sulfonate, sodium 2-acrylamido-2-methylpropane-1-sulfonate or N-(3-aminopropyl)methacrylamide hydrochloride.

8. The polymer of claim 3 which is a copolymer and wherein the monomer containing said ligand is present from about 2 to about 60 weight percent of said copolymer.

9. The polymer of claim 3 wherein said metal is Ni(II).

* * * * *